United States Patent

Schnabel et al.

[11] 3,914,304
[45] Oct. 21, 1975

[54] PROCESS FOR PREPARING SECONDARY N-VINYL CARBOXYLIC ACID AMIDES

[75] Inventors: Horst Schnabel, Steinbach; Michael Mitzlaff, Bad Homburg, both of Germany

[73] Assignee: Hoechst Aktiengesellschaft, Frankfurt am Main, Germany

[22] Filed: July 18, 1974

[21] Appl. No.: 489,534

[30] Foreign Application Priority Data
July 20, 1973 Germany............................ 2336977

[52] U.S. Cl............................................ 260/561 R
[51] Int. Cl.².......................................... C07C 103/34
[58] Field of Search...................... 260/561 R, 561 N

[56] References Cited
UNITED STATES PATENTS
3,008,992   11/1961   Lynn et al...................... 260/561 R FOREIGN PATENTS OR APPLICATIONS
1,125,940   9/1968   United Kingdom Primary Examiner—C. Davis
Attorney, Agent, or Firm—Curtis, Morris & Safford

[57] ABSTRACT

Secondary N-vinyl carboxylic acid amides having the formula $R^1CO-NH-CH=CH_2$ (I), wherein $R^1$ represents hydrogen or a lower alkyl group, are prepared by heating N-α-alkoxyethyl carboxylic acid amides having the formula

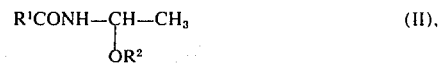

wherein $R^1$ has the above signification and $R^2$ represents a lower alkyl group, in a gaseous state to temperatures from about 300° to 600°C, by condensing the gas mixture formed thereby, while rapidly cooling and by working up in known manner. From the products (I) water-soluble polymers having valuable properties may be obtained.

3 Claims, No Drawings

PROCESS FOR PREPARING SECONDARY N-VINYL CARBOXYLIC ACID AMIDES

N-vinyl carboxylic acid amides are of scientific and technical interest actually, because water-soluble polymers having valuable properties can be prepared therefrom (cf. Ullmanns Encyclopadie der technischen Chemie, third edition, volume 14, pages 261–64).

For tertiary vinyl carboxylic acid amides having the formula (A)

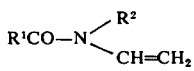

wherein $R^1$ and $R^2$ each represent alkyl groups, a number of processes for preparing them are known, for example, the addition of N-alkyl amides on acetylene in the presence of basic catalysts (cf. Liebigs Ann. Chem. 601.81 (1956), DBP 1,176,124), the dissociation of N-α-alkoxy-ethyl-N-alkyl amides, either thermally (cf. Isvestija Akadimii Nank, SSR Chimija (1959) 892–895) or in the presence of acid catalysts (USP 3,377,340; British Pat. No. 1,125,324), or the dissociation of N-β-acetoxyethyl-N-alkyl-carboxylic acid amides (U.S. Pat. No. 2,231,905).

For secondary N-vinyl carboxylic acid amides, e.g. compounds of the above-mentioned formula (A), wherein $R^2$ represents a hydrogen atom and $R^1$ an alkyl group, a number of processes for preparing have been described as well. In German Pat. No. 1,088,479 is described the preparation of secondary N-vinyl carboxylic acid amides by reacting vinyl isocyanate with alkyl magnesium halides. This method is however unsuitable for technical processes because of the low yields (up to 63.5%) and because vinyl isocyanate and Grignard compounds are used as starting components. The thermal dissociation of ethylidene bisamides also leads to secondary N-vinyl amides according to the following reaction equation (cf. Tetrahedron Letters (1965) pages 4523 to 4526):

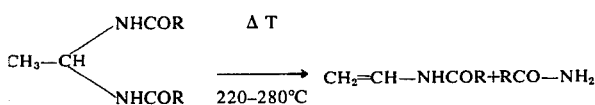

In this process however only yields of from 40 to 70% are obtained. Moreover, the free NH-groups present in both dissociation products are likely to result in mixed association products, in which the desired secondary vinyl amides cannot be separated in simple manner from the primary amides necessarily formed.

For similar reasons the above-mentioned process for preparing tertiary N-vinyl amides by dissociating N-α-alkoxyethyl-N-alkylcarboxylic acid amides has not been used hitherto for the technical preparation of secondary N-vinyl carboxylic acid amides by dissociating N-α-alkoxyethyl-carboxylic acid amides, owing to the fact that the NH-groups contained in the starting and final product cause the above-mentioned difficulties for separating, which prohibit the use of the process on an industrial scale.

The object of the present invention is a process for preparing secondary N-vinyl carboxylic acid amides, wherein the above-mentioned problems are largely surmounted or eluded owing to the complete or nearly complete conversion during the dissociation of N-α-alkoxyethyl-carboxylic acid amides.

The present invention consequently provides a process for preparing secondary N-vinyl carboxylic acid amides having the formula (I)

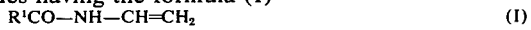

wherein $R^1$ represents a hydrogen atom or an alkyl group having 1 to 3 carbon atoms, by heating N-α-alkoxyethyl-carboxylic acid amides having the formula (II)

wherein $R^1$ has the same signification as in formula (I) and $R^2$ represents an alkyl radical having from 1 to 4 carbon atoms, in a gaseous state to temperatures from 300° to 600°C, by condensing the gas mixture formed in this process while rapidly cooling and by isolating in known manner the N-vinyl carboxylic acid amides of the formula (I) from the condensate.

The compounds having the formula (II) may be prepared for example by electrolysis of the corresponding N-acyl-α-aminopropionic acids in an alcohol $R^2OH$ (cf. R. P. Linstead et al., J. Chem. Soc. 2,854–2,858, (1951)).

The following starting substances are used for example for the process according to the invention: N-α-methoxyethylacetamide, N-α-ethoxyethyl-acetamide, N-α-propoxyethyl-acetamide, N-α-butoxyethyl-acetamide, N-α-methoxyethyl-propionic acid amide, N-α-ethoxyethyl-propionic acid amide, N-α-propoxyethylpropionic acid amide, N-α-butoxyethyl-propionic acid amide, N-α-methoxyethyl-butyramide, N-α-ethoxyethyl-butyramide, N-α-propoxyethyl-butyramide and N-α-butoxyethyl-butyramide. Preferred compounds having the formula (II) are those, wherein $R^1$ represents methyl and $R^2$ represents methyl or ethyl, especially preferred is N-α-methoxyethyl-acetamide. It is quite natural that N-α-alkoxyethyl-carboxylic acid amides having higher alkyl or cycloalkyl radicals are as well suitable for carrying out the process of the invention, but the aforesaid compounds are especially advantageous.

The compounds having the formula (II) are dissociated into the corresponding compounds having the formula (I) by heating compounds of the formula (II) in a liquid or gaseous state to temperatures, where the desired dissociation takes place quantitatively or almost quantitatively. These temperatures are generally in the range of from 300° to 600°C, advantageously of from 330° to 500°C. The dissociation is advantageously carried out as follows: The starting material is evaporated and conducted in a gaseous state into a heated reaction zone being advantageously in a suitable reactor. Reactors of any design wherein the required reaction conditions can be realised, may be used, for example a reaction chamber or a spherical reactor. A preferred reactor however is a reaction tube, into which the starting product of the formula (II) is introduced at one end and where the dissociation mixture consisting of the corresponding compound of formula (I) and the separated alcohol R²OH leaves at the other end. The reaction may also be carried out in the presence of an inert gas, as for example nitrogen, argon or carbon dioxide. It may take place at atmospheric or subatmospheric pressure. The starting material is advantageously evaporated under about the same pressure under which the dissociation takes place.

The dimensions of the reaction zone are not critical, if it is guaranteed that the whole gas is heated to the reaction temperature while passing through the zone.

The average time of direct contact in the reaction zone is such that the N-α-alkoxyethyl-carboxylic acid amide is dissociated completely or nearly completely to N-vinyl-carboxylic acid amide and alcohol. At higher temperatures as well as in the case of an increasing proportion of inert gas the time of direct contact is shorter than at lower temperatures. The time of direct contact depends on the parameters temperature, pressure, proportion of inert gas as well as the amount of reactant put through and is generally in the range of from 0.01 to 20 sec. according to the reaction conditions, but the upper limit may be exceeded. It is advantageously in the range of from 0.1 to 10 sec.

An empty, heated recipient provided with an inlet and an outlet, especially an empty tube, can be used as reaction zone, where the reaction according to the invention can be effected. For a better heat transmission however a reaction zone charged with filling bodies can be used as well. Although simple flint stones may already serve as filling bodies, filling bodies made from an inert material as used for example in the distilling technique, are advantageously used, for example made from glass, quartz, ceramics, porcelain, carbon, or graphite, steel, steel alloys, chromium, silver or another noble metal. The usual ring-or saddle-shaped filling bodies, for example of glass, porcelain, preferably of steel or stainless steel, are especially suitable. Compressed zinc oxide, zirconium oxide, thorium oxide, cerium oxide, chromium oxide, silicium dioxide, magnesium oxide, aluminium oxide, aluminium phosphate or calcium carbonate is used as well, the latter however may partly cause the formation of by-products. The filling bodies may also consist of an acid material or acid resistant filling bodies may be coated or combined in some other way with an acid material. Acid substances on an inert porous carrier, such as pumice stone or diatomaceous earth are especially used. Acid substances for the purpose of the invention are acids which are not or little volatile at the used temperature, for example pyrophosphoric acid or polyphosphoric acids. Acid salts or salts yielding acid solutions on hydrolysing, as for example sodium hydrogen sulphate, alums, cobalt or zinc chloride, may also be used. Filling bodies made of acid materials are less preferred in comparison with the first mentioned solid filling bodies, because they may partially cause the formation of by-products.

After leaving the reaction zone the reaction gases are cooled to temperatures of advantageously less than +70°C, preferably of less than +50°C so rapidly that no recombination, if possible, or only a little recombination of the dissociation products to the starting material takes place. It is especially advantageous in this process to pass rapidly the range between the condensation temperature and final temperature. This cooling process advantageously lasts for less than 5 sec., especially for less than 1 sec. and is carried out as follows: The reaction gases are introduced into a condenser or a receiver advantageously cooled to temperatures of less than 0°C, preferably less than −10°C and more preferably less than −20°C. The cooling may also be carried out advantageously by introducing an optionally cooled inert liquid into the reaction gases through a nozzle or by introducing the reaction gases into a cooled inert liquid (quenching). Care should be taken that the liquids used for this purpose do not decompose when leaving the furnace, even at the high temperatures, or react with the sensitive N-vinyl carboxylic acid amides. Especially suitable cooling mediums for quenching are aprotic liquids having low solidification points. Hydrocarbons having a chain length of from 5 to 12 carbon atoms as for example petroleum ether, gasoline fractions, kerosine etc. are advantageously used in a pure form or as mixtures. Toluene, xylene, inert lower halohydrocarbons or liquid nitrogen or dry ice are also suitable.

The reaction mixture is worked up in known manner, for example by distilling off the alcohol separated in the reaction under reduced pressure and by optionally purifying the N-vinyl carboxylic acid amide, for example by distilling or crystallising from a solvent. If a liquid used for quenching, the reaction mixture is worked up by distilling off this liquid and the separated alcohol or, if a liquid is used, wherein the desired product is not or difficulty soluble, by filtration.

The following examples illustrate the invention.

EXAMPLE 1

11.7 g (0.1 mol) of N-α-methoxyethyl-acetamide are distilled in 35 min. at 200 torr through a glass tube having a length of 25 cm and a width of 1 cm, which is charged with steel spirals and heated to from 400° to 430°C. The vapors leaving the reactor are condensed in a receiver cooled to −30°C. 11.2 g of the crude product obtained in this way contain besides methanol 71.4% (0.094 mol) of N-vinyl acetamide and less than 2% of the starting material. This corresponds to a yield of 95% of the theoretical. The product can be polymerised without further purification. On the other hand it can be liberated from the samll quantities of the starting material still present after distillation of the solvent, by simple recrystallising, for example from isopropyl ether. The starting material may be used anew for dissociating.

EXAMPLE 2

150 g (1.28 mol) of N-α-methoxyethyl-acetamide are distilled in 3 hours at 190 torr through a glass tube heated to from 460° to 480°C and having a length of 30 cm and a width of 1 cm, which is charged with steel spirals. 143 g of crude product are collected in the receiver cooled to −40°C. By distilling at 0.2 torr, 103 g (1.19 mol) of crystalline N-vinyl-acetamide are obtained therefrom (boiling point 55°C/0.2 torr), containing less than 1% of the starting material, corresponding to a yield of 94% of the theoretical.

EXAMPLE 3

1,407 g (12 mol) of N-α-methoxyethyl-acetamide are flashevaporated in about 5 hours at from 150 to 160 torr in a flask heated by an oil bath having 260°C. The vapors continuously pass through a quartz tube having a length of 110 cm and a width of 2 cm, which is charged with stainless steel spirals (V4 A) and heated in a tube furnace to from 350° to 400°C. By quenching the gas leaving the reactor, 1,385 g of substance are obtained in the form of a condensate in a receiver cooled to from −30° to −50°C. The methanol formed in this process is distilled off the crude product by heating under reduced pressure, until an inner temperature of 70°C is obtained at a pressure of 1 torr. 990 g (11.64 mol) of N-vinyl-acetamide remain, crystallising after cooling and only containing less than 1% of the starting material. The yield is 97% of the theoretical. The product may be further purified by simple recrystallisation or be used as such for polymerising.

EXAMPLE 4

50 g (0.38 mol) of N-α-ethoxyethyl-acetamide are flashevaporated in a flask heated to 260°C in about 20 min. at from 140 to 145 torr. The vapors are conducted with 500 ml of nitrogen (measured at atmospheric pressure) through the reaction tube used in example 3 at a temperature of from 350° to 400°C. In a receiver cooled to −30°C, 49 g of dissociation product condense. 32.5 g (0.375 mol) of N-vinyl-acetamide containing even less than 2% of the starting material are obtained by distillation at 0.1 torr. This corresponds to a yield of 98% of the theoretical.

EXAMPLE 5

14.5 g (0.1 mol) of N-α-methoxyethyl-butyramide are flashevaporated in a flask heated to 260°C in 20 min. at about 150 torr. The vapors are conducted with one liter of nitrogen (measured at atmospheric pressure) through the reactor used in example 3, which is heated to 450°C and are then condensed in a receiver cooled to −20°C. 13.5 g of dissociation product are obtained, yielding on distillation at 0.1 torr 10.5 g (0.092 mol) of N-vinyl-butyramide, containing less than 2% of the starting material. This corresponds to a yield of 92% of the theoretical.

EXAMPLE 6

16 g (0.1 mol) of N-α-isobutoxyethyl-acetamide are reacted and worked up under the same conditions as described in example 5. The dissociation of the starting material is practically complete. 8.1 g (0.095 mol) of N-vinyl-acetamide are obtained, corresponding to a yield of 95% of the theoretical.

EXAMPLE 7

13.1 g (0.1 mol) of N-α-methoxyethyl propionamide are dissociated and worked up under the same conditions as described in example 5. 9.7 g (0.098 mol) of N-vinyl-propionamide (boiling point 65° C/0.1 torr) are obtained, corresponding to a yield of 98% of the theoretical.

EXAMPLE 8

11.7 g (0.1 mol) of N-α-methoxyethyl-acetamide are flashevaporated in a flask heated to 340°C at atmospheric pressure. Within 30 min. the vapors are conducted through a glass tube heated to from 360° to 380°C, charged with stainless steel spirals and having a length of 30 cm and a width of 1 cm and are then condensed in a receiver cooled to from −30° to −50°C. 11.4 g of the condensate contain, besides the split off methanol and a small quantity of the starting material, 8.3 g (0.098 mol) of N-vinyl-acetamide, corresponding to a yield of 98% of the theoretical.

EXAMPLE 9

51.6 g (0.5 mol) of N-α-methoxyethyl-formamide are dropped into a flask heated by an oil bath to 255°C at 150 torr in 20 min. The vapors formed thereby are conducted with approximately 1 l of nitrogen (measured at room temperature and atmospheric pressure) through the reactor described in example 3 heated to 400°C and are then condensed in a receiver cooled to −40°C. 49 g of dissociation product are obtained. By distilling at 0.1 torr 33.7 g (0.47 mol) of N-vinylformamide (boiling point 41°C/0.1 torr) are isolated therefrom. This corresponds to a yield of 94% of the theoretical.

What is claimed is:

1. Process for preparing secondary N-vinyl carboxylic acid amides having the formula (I)

wherein R¹ represents a hydrogen atom or a lower alkyl group, which comprises heating N-α-alkoxyethyl carboxylic acid amides having the formula (II)

wherein R¹ has the above signification and R² represents an alkyl radical, in a gaseous state to temperatures in the range of from 300° to 600°C approximately, condensing the gas mixture formed in this process while rapidly cooling and isolating the N-vinyl carboxylic acid amide of the formula (I) from the condensate in known manner.

2. Process as claimed in claim 1, which comprises heating N-α-alkoxyethyl carboxylic acid amides of the formula (II) in a gaseous state to temperatures of from 330° to 500°C approximately.

3. Process as claimed in claim 1, wherein R¹ represents methyl and R² is methyl or ethyl.

* * * * *